United States Patent [19]
Iritani et al.

[11] 3,746,880
[45] July 17, 1973

[54] CIRCUIT FOR DETERMINING THE STATE OF A DC ISOLATED SWITCH

[75] Inventors: Tadamitsu Iritani; Yoshikazu Kumagai, Tokyo, Japan

[73] Assignee: Yokogawa Electric Works, Ltd., Tokyo, Japan

[22] Filed: Nov. 8, 1971

[21] Appl. No.: 196,268

[30] Foreign Application Priority Data
Nov. 20, 1970 Japan ............................ 45/102501

[52] U.S. Cl. ............................ 307/97, 340/248 R
[51] Int. Cl. ............................ H01h 31/34
[58] Field of Search .................. 340/248 R; 328/73, 328/1; 307/119, 120, 121, 122, 123, 124, 125, 97

[56] References Cited
UNITED STATES PATENTS
3,346,855 10/1967 Bishop ............................ 340/248 R

*Primary Examiner*—Herman J. Hohauser
*Attorney*—Howard M. Bollinger et al.

[57] ABSTRACT

A switch and a device for monitoring the open or closed state of the switch are conneted by a DC isolation circuit including an isolating transformer, a capacitor in the transformer primary circuit with the switch connected across the capacitor, and, in the transformer secondary circuit, an alternating pulse signal source to charge the capacitor through the transformer. In this circuit, the impedance reflected into the transformer secondary winding varies in accordance with the open or closed state of the switch. To permit the state of the switch to be accurately determined, the circuit disconnects the alternating signal pulse source from the transformer secondary while applying a read signal pulse to the transformer secondary to determine the reflected impedance, thereby eliminating errors arising from superposition of the read signal on the alternating signal without necessitating synchronization of the two pulse signals.

9 Claims, 2 Drawing Figures

FIG. 1
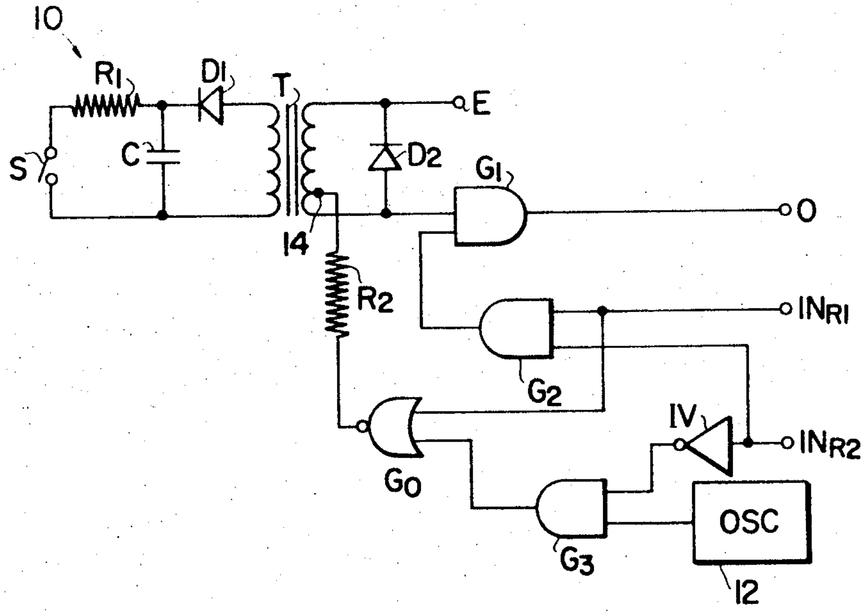
FIG. 2
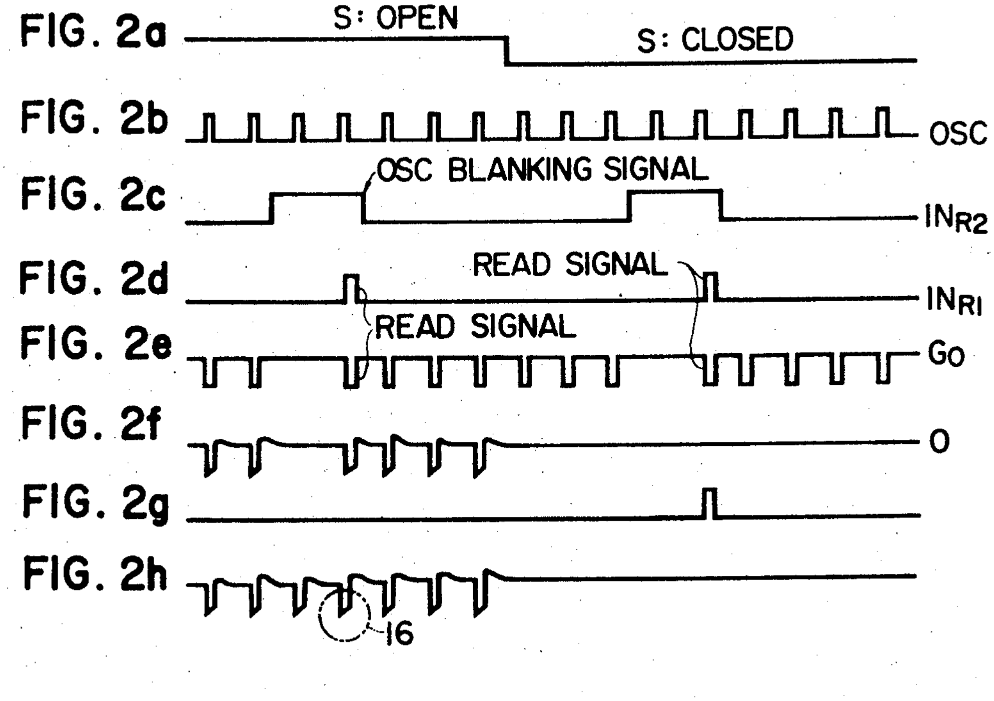
FIG. 2a FIG. 2b FIG. 2c FIG. 2d FIG. 2e FIG. 2f FIG. 2g FIG. 2h

CIRCUIT FOR DETERMINING THE STATE OF A DC ISOLATED SWITCH

BACKGROUND OF THE INVENTION

1. Field of the Invention

The present invention relates to circuits arranged to provide DC isolation of a switch and yet permit the open or closed state of the switch to be determined. Such circuits are useful in the field of process control, which frequently locates a measuring device switch in the process location, and maintains a computer or data processor to monitor the switch and provide process control in response thereto. Frequently, the switch and computer are grounded at points standing at different DC potentials, and hence DC isolation is required. A switch, however, is inherently a DC device, and hence problems arise in determining its open or closed state while maintaining DC isolation.

2. Description of the Prior Art

One known circuit for providing a switch with DC isolation while enabling the open or closed state of the switch to be determined employs an isolation transformer having in its primary circuit a diode and capacitor, with the switch connected to short circuit the capacitor when closed. The transformer secondary circuit applies an AC pulse signal to the transformer which charges the capacitor according to the open or closed state of the switch, thereby causing the impedance reflected into the transformer secondary winding to vary according to the open or closed state of the switch. The state of the switch is monitored by applying a read signal pulse in the secondary to measure the reflected impedance. A drawback of this method is that if the read signal is not synchronized with the AC charging signal, they may become superimposed, intensifying transient phenomena in the transformer and resulting in incorrect determinations of the switch state.

SUMMARY OF THE INVENTION

Objects of the present invention are to provide a circuit for determining the open or closed state of a switch while maintaining the switch in DC isolation, wherein the switch condition can be accurately determined without requiring synchronization of a read signal and charging signal, and without risk of error due to superposition of the read signal and charging signal.

The circuit according to the invention is of the type including an isolating transformer with a primary circuit including a charging element interconnected with the switch, and a secondary circuit including an alternating signal source for charging the charging element to cause the reflected impedance to vary according to the open or closed state of the switch. The circuit is characterized by means for applying the read signal to the transformer secondary so as to determine the reflected impedance and thus the condition of the switch, and by means for disconnecting the alternating signal source from the transformer secondary for a period of time embracing the time when said read signal is applied, thereby eliminating errors due to the superposition of the read signal on the alternating signal. The disconnection of the alternating signal source is brought about by means providing a blanking signal embracing the read signal and means gating the alternating signal with the blanking signal.

Other objects, aspects, and advantages of the invention will be pointed out, or be apparent from, the detailed description hereinbelow, considered together with the following drawings.

DESCRIPTION OF THE DRAWING

FIG. 1 is a circuit diagram illustrating circuit according to the invention, arranged to maintain a switch in DC isolation and to permit its open or closed position to be determined; and FIG. 2 illustrates waveforms appearing at various points in the circuit of FIG. 1.

DESCRIPTION OF THE PREFERRED EMBODIMENT

FIG. 1 illustrates a circuit 10 arranged according to the invention to maintain a switch S in DC isolation while permitting the open or closed state of switch S to be determined accurately. Although shown as a mechanical switch, the switch S may also be an electronic switch. Circuit 10 comprises an isolation transformer T having in its primary circuit a capacitor C and diode D1 in series with the primary winding to permit charging of capacitor C therethrough. Switch S and a resistor R1 are connected across capacitor C to effectively short circuit the capacitor when switch S is closed. The secondary circuit of transformer T includes a freewheeling diode D2 and voltage source E, and an oscillator 12 which supplies signal pulses (with a waveform as shown in FIG. 2B) applied to the secondary winding of transformer T via an intermediate tap 14, a resistor R2, and gates G0 and G3 to be described below. The alternating signal applied to transformer secondary tap 14 induces a voltage in the transformer primary circuit which (A) when switch S is open, charges capacitor C to a peak value of voltage Vc as a result of the rectification provided by diode D1, or (B) when switch S is closed, bypasses capacitor C, which is permitted to discharge through resistor R1 and switch S.

A read pulse signal as shown in FIG. 2D is applied to terminal INR1 and this signal is applied via gate 60 to be described below to intermediate tap 14 to measure the impedance reflected into the transformer secondary, yielding at output terminal 0 a signal indicative of the open or closed state of switch S. When switch S is open, capacitor C charges, and diode D1 appears as an open circuit, causing the transformer secondary to have a large reflected impedance. When switch S is closed, diode D1 appears as a short circuit and the impedance reflected into the transformer secondary is low. The determination of the switch condition may be disturbed if the read signal pulse and charging signal pulse become superimposed, creating transformer transients which may produce a false reading.

According to the invention, circuit 10 is provided with means for disconnecting oscillator 12 from transformer T for a period of time embracing the application of the read signal pulse. The disconnecting means comprises an input terminal INR2 to which a blanking signal as shown in FIG. 2C is applied from a source (not shown). The blanking signal preferably begins a period of time t in advance of the read signal pulse to permit transients to die down, and lasts until the read signal pulse has been completed. The blanking signal is applied to an inverter IV, the output of which is applied to AND gate G3 which also receives the alternating pulse signal from oscillator 12. Consequently, gate G3 passes the alternating signal only when the blanking signal is not present. The alternating signal passed by gate G3 is applied to an input of NOR gate G0, the other input of which is the read signal pulse applied to terminal INR1. The output of NOR gate G0, applied to transformer tap 14 through resistor R2, is thus the inverted sum of the read signal pulses and the blanked alternating signal pulses, as shown in FIG. 2E. This signal, applied to the transformer secondary, develops in the transformer primary the waveform shown in FIG. 2F.

An output signal appears at output terminal 0 only in response to read signal pulses as a result of the gating provided by AND gates G1 and G2. As shown, the read signal pulses are applied through gate G2 only when a blanking signal at input terminal INR2 exists, assuring that no reading will take place except when oscillator 12 has been properly disconnected. Gate G1 is arranged to pass an output to terminal 0 only when the read signal pulse is applied to one of its inputs via gate G2. As a result, there will be an output at terminal 0, as shown in FIG. 2G, only when a read signal pulse is applied to circuit 10, and only when switch S is closed.

It can be readily seen that by disconnecting oscillator 12 before applying the read signal pulse, the possibility of pulse superposition is eliminated and stable, accurate readings are assured. FIG. 2H illustrates the circumstance avoided by the present invention, wherein the waveform portion enclosed within circle 16 is distorted by superposition of the oscillator output and the read signal pulse, intensifying transient phenomena in transformer T and interfering with accurate reading.

Although specific embodiments of the invention have been disclosed herein in detail, it is to be understood that this is for the purpose of illustrating the invention, and should not be construed as necessarily limiting the scope of the invention since it is apparent that many changes can be made to the disclosed structures by those skilled in the art to suit particular applications.

We claim

1. A circuit for determining the open or closed state of a switch while maintaining the switch in DC isolation, the circuit including an isolating transformer with a primary circuit including a charging element interconnected with said switch, and a secondary circuit including an alternating signal source for charging said charging element through the transformer according to the open or closed state of the switch whereby the impedance reflected into said transformer secondary winding varies according to the open or closed state of the switch, characterized by means for applying a read signal to the transformer secondary winding to determine the impedance reflected therein from said primary circuit, thereby to determine the open or closed state of the switch, and means for disconnecting said alternating signal source from said transformer secondary while applying said read signal, thereby eliminating reading errors due to superposition of the read signal on the alternating signal 2. A circuit as claimed in claim 1 wherein said alternating signal and said read signal are both pulse signals.

3. A circuit as claimed in claim 1 wherein said means for disconnecting the alternating signal source comprises means for providing a blanking signal embracing the read signal and, gate means connecting said alternating source to said transformer secondary winding, said gate means being inhibited by said blanking signal.

4. A circuit as claimed in claim 3 in which said blanking signal begins in advance of said read signal to permit transients to settle, and ends after said read signal is completed.

5. A circuit as claimed in claim 3 wherein said read signal and said alternating signal are applied to the transformer secondary winding through NOR gate means.

6. A circuit as claimed in claim 1 wherein said means for applying a read signal to the transformer secondary comprises an output terminal, coincidence gate means connecting said output terminal and said transformer winding, means applying the read signal to the coincidence gate means, and means applying the read signal to at least a portion of the transformer secondary winding, whereby a signal will appear at said output terminal only when the impedance of said transformer secondary winding is low in response to the closed state of said switch and only during a read signal.

7. A circuit as claimed in claim 6 wherein said means for disconnecting the alternating signal source comprises means for providing a blanking signal embracing the read signal and gate means inhibited by the blanking signal for connecting the alternating signal with said transformer secondary winding, and wherein the means applying the read signal to the coincidence gate means includes second coincidence gate means and means for applying the blanking signal to the second coincidence gate means, whereby said read signal will be applied to said first coincidence gate means only during the existence of a blanking signal.

8. A circuit as claimed in claim 1 wherein said alternating signal source is a pulse oscillator, said charging element is a capacitor, said switch is connected to discharge said capacitor when in a closed state, and said primary circuit includes a diode in series with said primary winding and capacitor, whereby said capacitor is charged by said alternating pulse signal when said switch is in an open state.

9. A method for determining the open or closed state of a switch while maintaining the switch in DC isolation, comprises connecting said switch with a charging element, in a primary circuit, isolating said primary circuit by means of an isolation transformer from a secondary circuit, applying an alternating signal in said secondary circuit so as to charge the charging element in the primary circuit according to the condition of the switch, applying a read signal in said secondary circuit so as to measure the impedance reflected through from said primary circuit, and disconnecting said alternating signal from said secondary circuit while said read signal is being applied, thereby eliminating reading errors due to superposition of the read signal with the alternating signal.

* * * * *